United States Patent [19]

Wilson et al.

[11] Patent Number: 5,005,036

[45] Date of Patent: Apr. 2, 1991

[54] PROCESSING APPARATUS

[75] Inventors: William B. Wilson, Hamlin; Matthew DiPietro, Webster; Richard K. Neace, Hilton; Vincent B. Dethier, Rochester; Raymond G. Hauss, Rochester; James R. Louk, Rochester, all of N.Y.

[73] Assignee: Eastman Kodak Company, Rochester, N.Y.

[21] Appl. No.: 397,147

[22] Filed: Aug. 22, 1989

[51] Int. Cl.[5] .......... G03B 3/08

[52] U.S. Cl. .......... 354/322; 354/328; 354/330; 354/340

[58] Field of Search .......... 354/316, 320, 321, 322, 354/328, 329, 330, 319, 340, 344

[56] References Cited

U.S. PATENT DOCUMENTS

| | | | |
|---|---|---|---|
| 741,213 | 10/1903 | Barrett et al. | 354/328 |
| 785,113 | 3/1905 | Matthey et al. | 354/322 |
| 1,233,109 | 7/1917 | Nesbit | 134/76 |
| 2,544,644 | 3/1951 | Allen | 354/322 |
| 2,723,610 | 11/1955 | Morrison | 134/78 |
| 2,975,695 | 3/1961 | Tsuno | 354/322 |
| 3,010,377 | 11/1961 | Kettler | 354/316 |
| 3,156,173 | 11/1964 | Meyer | 354/322 |
| 3,412,667 | 11/1968 | Hunt | 134/64 R |
| 3,722,384 | 3/1973 | Chiesa | 354/322 |
| 4,005,464 | 1/1977 | Krehbiel | 354/322 |
| 4,011,573 | 3/1977 | Braico | 354/322 |
| 4,045,809 | 8/1977 | Landers | 354/322 |
| 4,410,257 | 10/1983 | Thebault | 354/322 |
| 4,497,559 | 2/1985 | Maris et al. | 354/322 |

*Primary Examiner*—A. A. Mathews

*Attorney, Agent, or Firm*—G. Herman Childress

[57] ABSTRACT

Processing apparatus for photographic film, particularly intraoral xray film, in which the various processing stations are positioned in a circle about a central rotatable column. The column has an external spiral groove in which rides a pin carried by, and extending into the bore of, a hub which fits around the column. Rotation of the column moves the hub up or down, depending upon the direction of rotation. The hub carries a plurality of arms equal in number to the number of stations, seven in the apparatus disclosed. Each arm has a magnet for attaching a novel film holder which is detachable at the unloading station. After loading a film holder with film to be processed, the holder is loaded into the machine through a spring-pressed loading door onto a loading platform which moves the film holder upwardly to engage it with one of the arms when the door is closed. Raising, rotation and lowering of the hub, arms and film holders is controlled by rotation of the column and proper arm positioning is assured by a novel escapement mechanism. The apparatus provides operation from loading to unloading with a minimum of human intervention, with high consistency of operation, and with treatment for equal time intervals in the developing, fixing, washing, liquid removal and spin drying stations.

17 Claims, 11 Drawing Sheets

PROCESSING APPARATUS

BACKGROUND OF THE INVENTION

1. Field of The Invention

This invention relates to photographic film developing apparatus of the type in which a film holder is moved in a circular path to a series of processing stations. The film holder is indexed from station to station and at the respective stations in lowered into and raised out of the station.

2. The Prior Art

It is known to develop photographic film in apparatus of the general type described above. See for example the following U.S. Pat. Nos.: 741,213, issued Oct. 13, 1903; 785,113, issued Mar. 21, 1905; 1,233,109, issued July 10, 1917; 2,544,644, issued Mar. 13, 1951; 2,723,610, issued Nov. 15, 1955; 2,975,695, issued Mar. 21, 1961; 3,010,377, issued Nov. 28, 1961; 3,412,667, issued Nov. 26, 1968; 3,722,384, issued Mar. 27, 1973; 4,011,573, issued Mar. 8, 1977; 4,410,257, issued Oct. 18, 1983; and 4,497,559, issued Feb. 5, 1985. These patents disclose various features of the general type of apparatus to which the present invention relates. They do not, however, disclose various distinguishing features of the invention, for example, the concept of achieving film holder agitation by reciprocation as carried out by the present invention, the structure by which the film holders are raised from and lowered into the respective stations and indexed to the next station, the novel loading station construction, the novel film holder structure, or the use of magnetic means to releasably attach the film holders to the structure which raises and lowers them and indexes them to successive stations.

These and other features of the invention provide a novel and highly efficient processing apparatus which can operate with a minimum of human intervention, and which operates reliably without the enormous complications found in the prior art use of numerous cams, pulleys, chains and the like.

BRIEF SUMMARY OF THE INVENTION

The present invention is intended for the processing of intraoral dental X-ray films, in which it is important that the processing be done accurately and with a minimum of human intervention. In a preferred form of the apparatus, a plurality of processing stations are disposed concentrically about a vertical axis at which is located a column having an external spiral groove which ends a short distance above the lower end of the column and a short distance below the upper end of the column. In a preferred embodiment, the stations comprise, in sequence, stations for: loading film holders into the apparatus, developing, fixing, washing, preliminary spinning, final spinning with drying, and unloading the film holders from the apparatus. The novel apparatus features can be used advantageously in processing apparatus using a different number and/or sequence of processing stations.

Means are provided for rotating the column in both clockwise and counterclockwise directions. The choice of rotational direction is governed by the desired direction of movement, downward or upward, of the film holders. The film holders are suspended from arms which project radially from an annular hub which rides up and down on the column. A pin carried by the hub rides in the groove in the column to cause upward and downward movement of the hub and associated film holders as the column rotates.

Near the lower end of the column, the groove terminates in a downwardly facing shoulder-like surface at the upper end of a reduced diameter portion of the column. The pin rides along this shoulder-like surface when it leaves the lower end of the groove. A coil compression spring surrounds the lower end of the column and exerts bias against the bottom surface of the hub to raise the hub slightly every time the rotating column moves the groove end portion into contact with the pin on the hub. The hub moves downwardly when the pin again rides on the shoulder. The result is a vertical reciprocation of the hub and the associated film holders to provide agitation when the film is immersed is a liquid at a processing station. This is accomplished while the column is rotating in the direction which moves the hub downwardly, or, preferably, by rotating the column a short distance in one direction and then the other to cause the pin to move into and out of the end portion of the groove.

When the column is rotated in the opposite (counterclockwise) direction at the termination of a phase of treatment, the pin reenters the groove and rides upwardly in the groove, carrying with it the hub and the associated film holders. In order for the hub to move up and down upon rotation of the column, the hub is restrained from rotation with the column by guide means which form a guideway extending upwardly along the column but terminating short of the upper end of the column. When the hub moves upwardly to a position clear of said restraining guide means, it is freed for rotational movement counterclockwise with the column. Means are provided for automatically limiting this movement to the degree appropriate to move the film holder means from one station to the next station. After this has occurred, the column rotation is again reversed to move the hub and film holder means downwardly so that the film holder means enter the next station.

At the stations in which spinning takes place, a central shaft of the film holder is received by a cup-like element and is rotated by frictional engagement with the cup-like element when the latter is rotated by an electric motor. The film holder is attached to the supporting arm in a novel manner by means of a magnet carried by the arm and magnetic material fixed to the upper end of the shaft of the film holder. The magnet is rotatably supported by the arm.

As mentioned above, the film holder is constructed about a normally vertically oriented central shaft which has a pointed or frustoconical lower tip to match a mating configuration on the cup-like part which engages the shaft at the spinning stations where liquid is spun off and the film spun dry. The holder comprises a cylinder, open at its bottom, with slots for film extending downwardly from its upper edge. The upper edge of the cylinder is attached to a circular plate which is concentric with the cylinder and which is attached to the shaft, which passes centrally through it. The plate has film receiving slots canted from radii of the shaft and communicating with the slots in the cylinder to receive the individual pieces of film. The circular plate is of greater diameter than the cylinder. A second plate of similar construction to the first plate is mounted on the shaft above the first plate and is rotatable between a position in which its slots are aligned with the slots in the first plate for loading and unloading, and a second position for processing. In the latter its slots are out of alignment with the slots in the first plate, thereby retaining film in the slots of the lower plate and cylinder during processing. In this processing position, the bottom surface of the second disc is spaced a short distance above the upper edges of the film. The lower end of the shaft is at or slightly above the plane of the lower end of the cylinder.

OBJECTS OF THE INVENTION

It should be apparent from the foregoing that the invention has a number of ingenious and novel features which accomplish the object of providing an automated processing apparatus for photographic films, particularly intraoral dental xray films, which operates with great accuracy with a minimum of human intervention and requires a minimum number of parts and adjustments.

DESCRIPTION OF THE DRAWINGS

The foregoing and other features and objects of the invention will be readily understood from the following detailed description of a preferred embodiment of the invention, when read in conjunction with the accompanying drawings, in which.

DETAILED DESCRIPTION OF A PREFERRED EMBODIMENT

Figure 1:
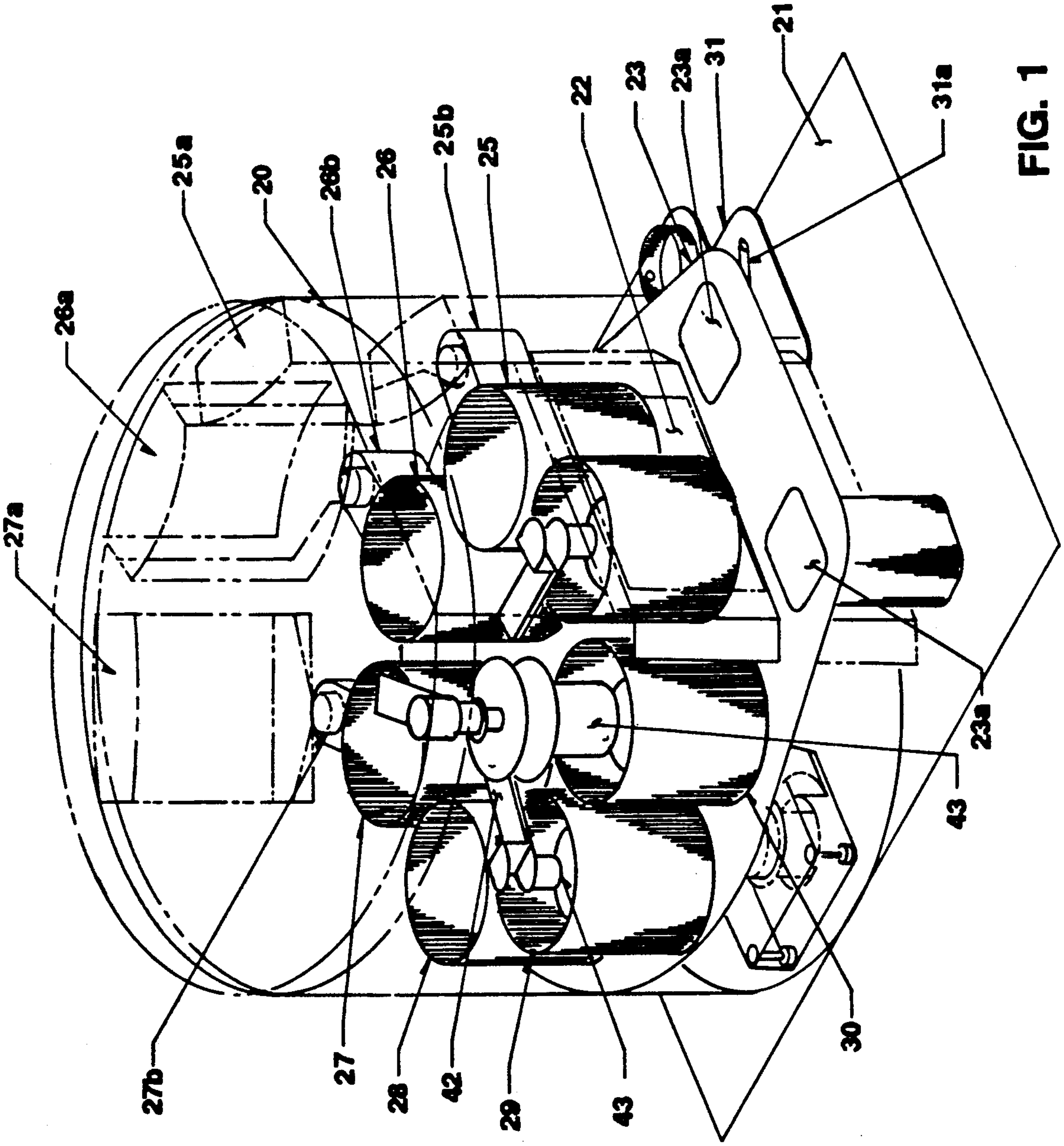
FIG. 1 is a perspective view of a dental x-ray film processor according to the invention, showing the general location of the stations.

Referring now to FIG. 1, there is shown a generally circular housing 20, the light tight cover for which is not shown. The housing and the apparatus within rest on a support 21. Extending outwardly from the housing at the loading station 22 is a loading platform 23 which has storage container openings 23*a* for film to be processed and for the film coverings which are removed before loading. Within the housing are the loading station 22, then, in a counterclockwise direction, a developing or activating station 25, a fixing station 26, a washing station 27, a liquid removal station 28, a drying station 29, and an unloading station 30. The treating stations comprise cylindrical housings which, in the case of the stations 25, 26 and 27, comprise tanks open at their upper ends, for holding the appropriate liquids. Above each of these three tanks are reservoirs 25*a*, 26*a* and 27*a* for the respective liquids. These reservoirs communicate with the respective tanks by conduits 25*b*, 26*b* and 27*b*, using gravity feed controlled by valves (not shown) in the drain lines for the tanks. Receptacles for the used liquids are located below the tanks, one such being indicated at 31. Fresh liquid feed is by means of "chicken feeder" arrangements which operate to maintain the liquid levels in the respective tanks as liquids are drained from them. One drain line is shown at 31*a*.

A central column 40 shown in other FIGS. and located at the center of the circle of stations, raises and lowers a hub 41 shown in other FIGS. to raise and lower radially extending arms 42 which support and transport film holders 43. There are seven of these arms 42, only three of which are shown in FIG. 1. At the liquid removal and drying stations, 29 and 30, the film holders are rotated by one or more motors, as will be explained in more detail with reference to FIG. 2.

Figure 2:
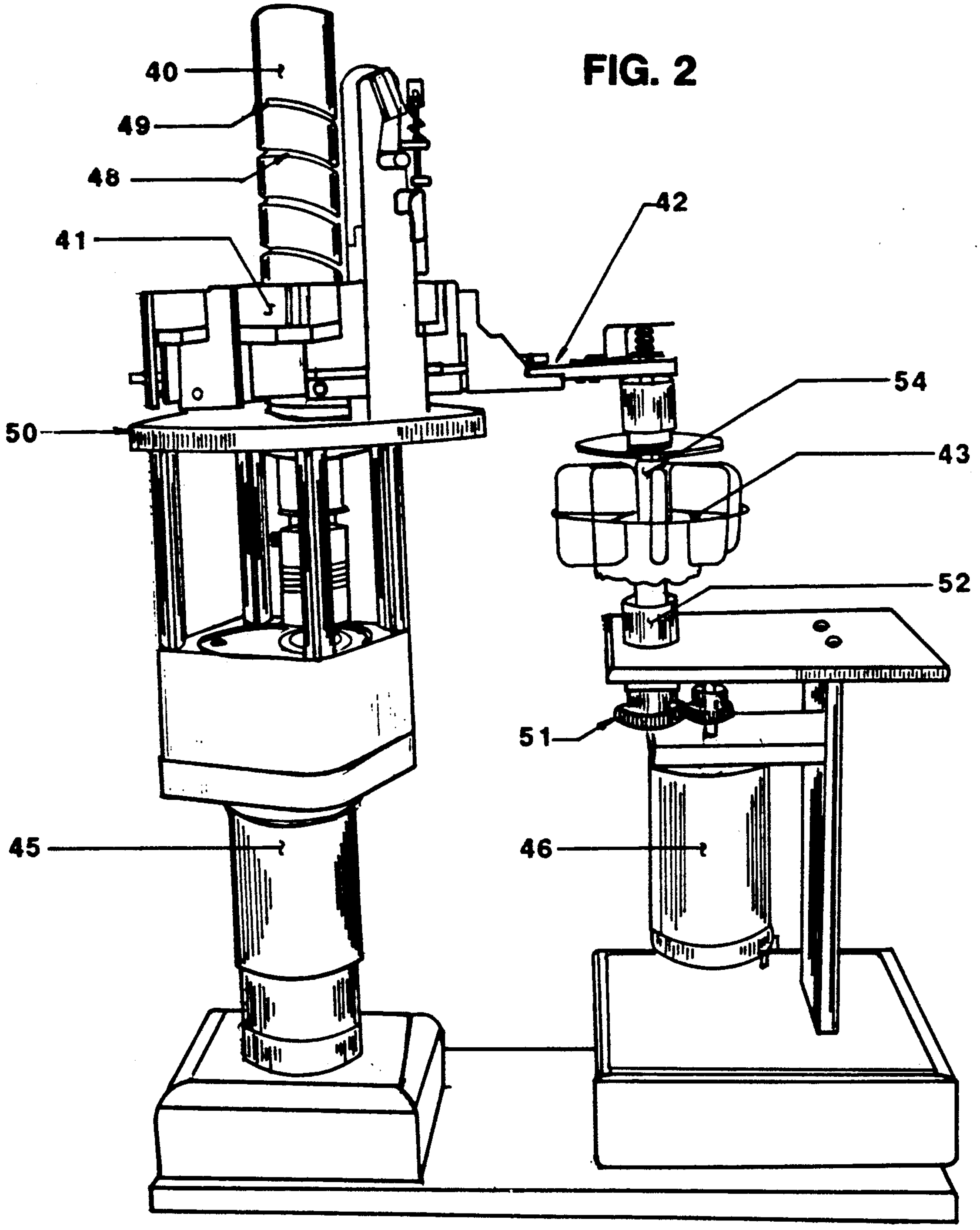
FIG. 2 is a side elevational view showing mechanical parts of the invention but with only one film holder supporting arm attached to the hub, the film holder being at a spinning station and being indicated in a non-detailed manner.
Figure 7:
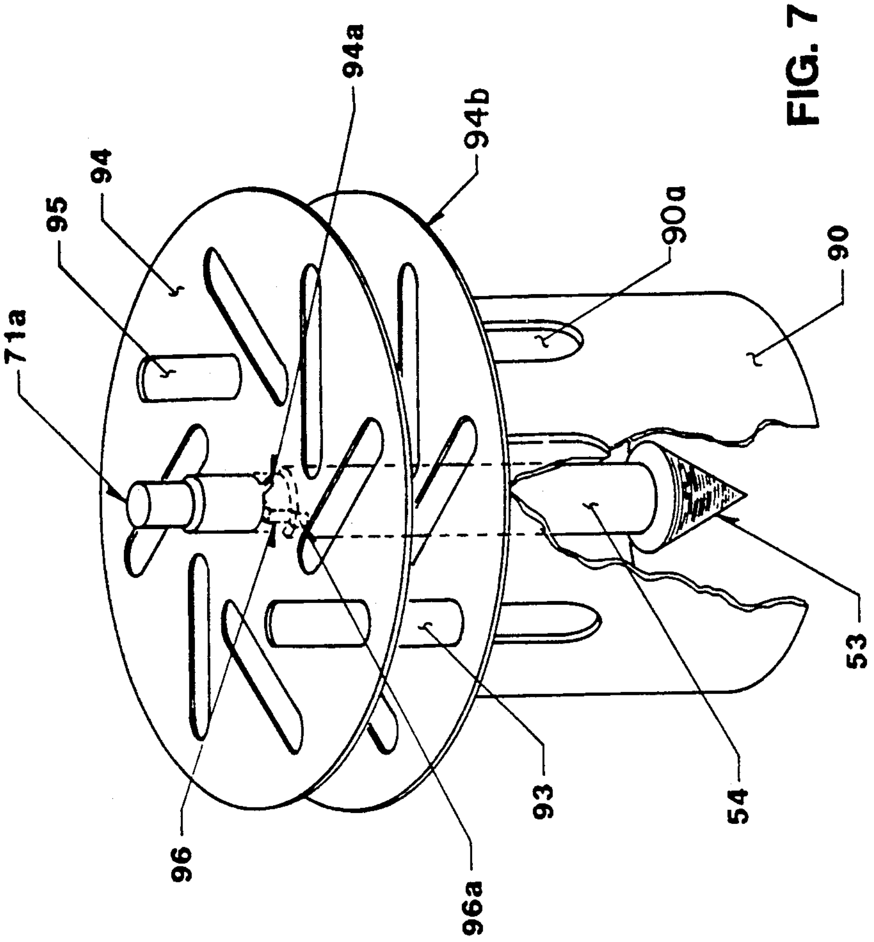
FIG. 7 is a perspective view of a film holder in one embodiment, taken slightly from above, showing the upper plate in loading and unloading position, a portion of the cylinder being broken away to show the lower portion of the central shaft.
Figure 8:
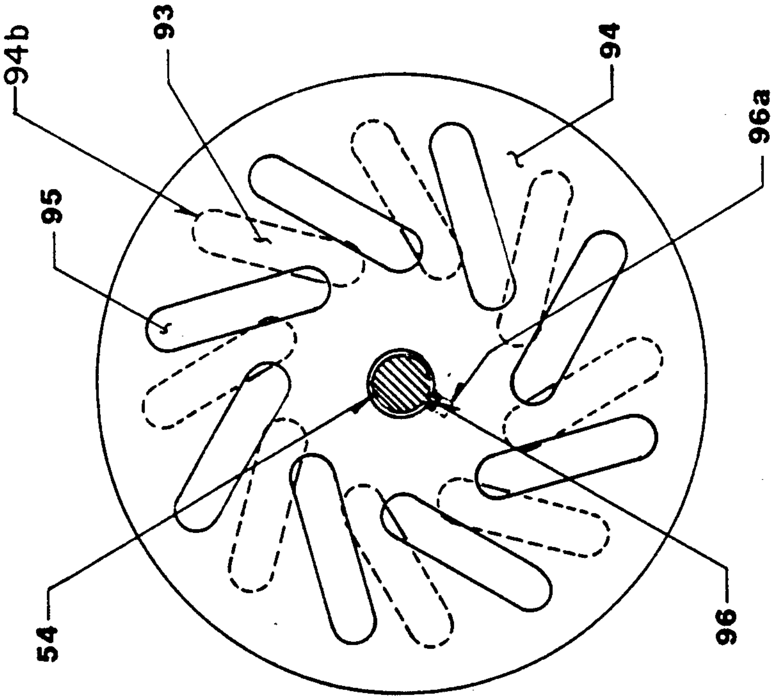
FIG. 8 is a plan view of the upper plate of a film holder, showing in broken lines the offset relation of the slots 93 and 95 in the processing position.
Figure 12:
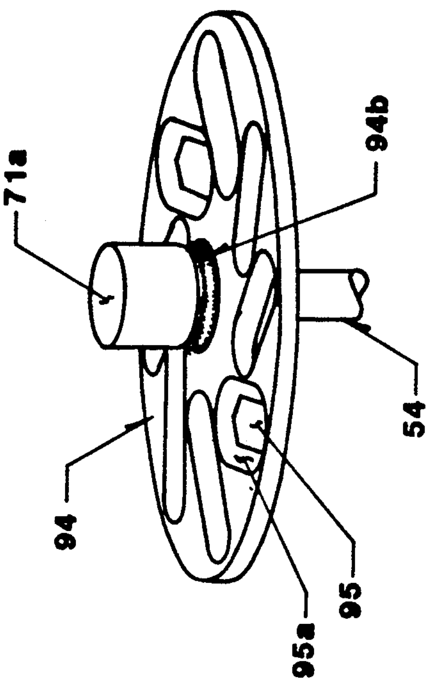
FIG. 12 is a perspective view of a portion of a film holder, showing a preferred construction.

Turning now to FIG. 2, a film holder 43 is shown (in a non-detailed manner) at one of the spinning stations. Details of the holder are shown in FIGS.7, 8, and 12. The general arrangement of the mechanical parts is well shown in FIG. 2, although details are better shown in other FIGS. Two motors are shown, motor 45, preferable a stepping motor, for rotating column 40, and motor 46 for driving one of the spinning operations. The upper end of a spiral groove 48 on the periphery of column 40 is seen at 49.

Column 40 is mounted for rotation on a base 50 mounted above motor 45. Motor 46, through gearing 51, drives a cup-like element 52 having a tapering concavity in its upper surface to receive a complementarily shaped pointed or frustoconical lower end portion 53 (FIG. 7) of the central shaft 54 of a film holder, the construction of which will be described below with reference to FIGS. 7, 8 and 12. A film holder spinning operation as shown in FIG. 2 is used at the liquid removal station and at the drying station.

Figure 4:
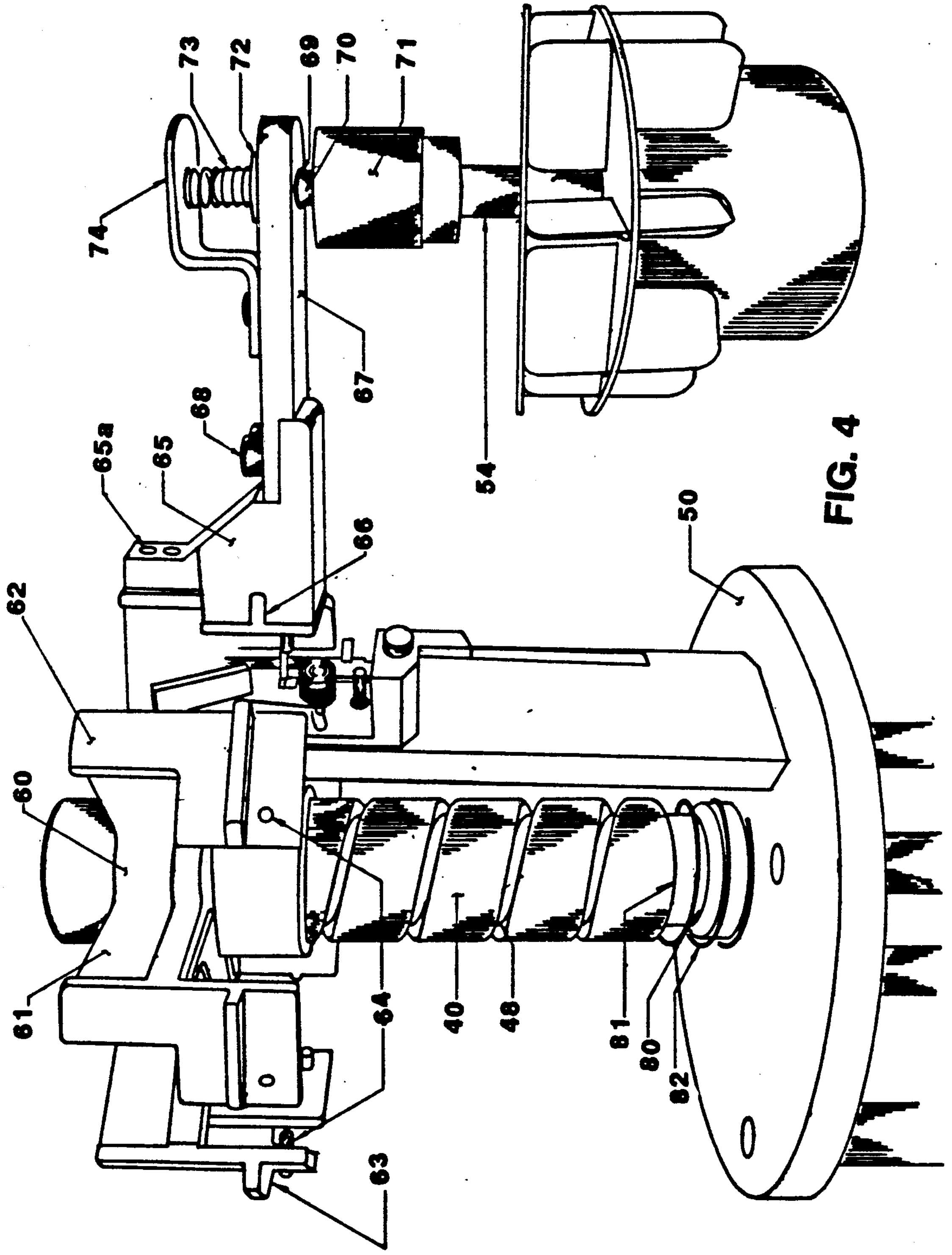
FIG. 4 is a view similar to FIG. 3, with the hub slightly below its FIG. 3 position, and with a closer view of the film holder arm construction, the film holder being merely indicated in a non-preferred form.
Figure 5:
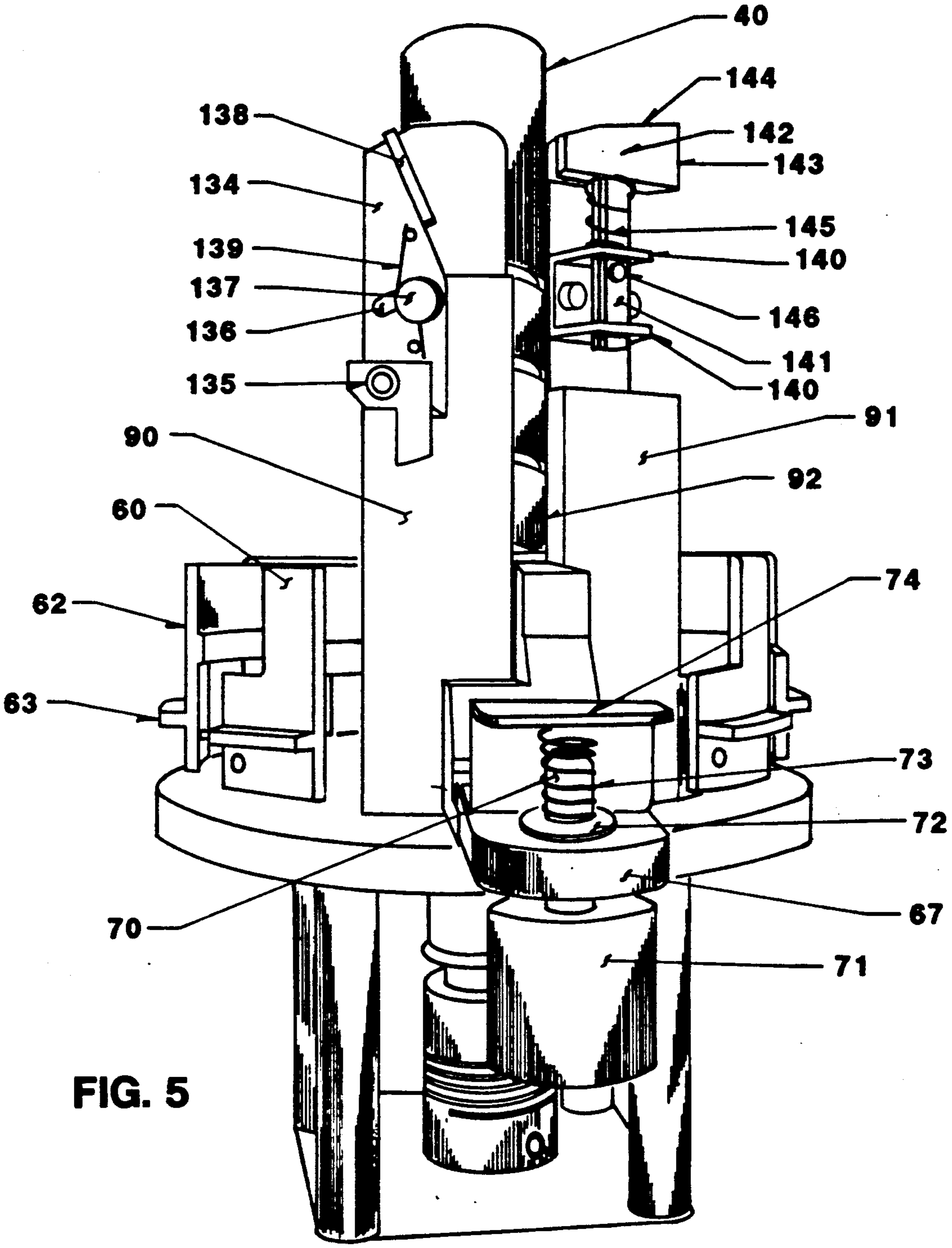
FIG. 5 is a view similar to FIG. 3, but with the hub at the bottom of its vertical movement and a film holder arm pointing toward the viewer, but with no film holder shown.

FIGS. 4 and 5 show more detail of the construction of hub 41 and the arms 42 which support the film carriers. Hub 41 comprises a central portion 60 having a central bore which fits snugly but slideably about column 40. Seven narrow arms 61 spaced at equal angles about the central portion 60, extend radially from central hub portion 60. In one embodiment, the outer end of each arm terminates in an enlarged portion 62 having a peripheral surface which is vertical when viewed from the side and convex when viewed from above. Near the lower end of this surface is an outwardly extending rib 63, and below that, on the inwardly facing surface of portion 62, is an inwardly extending pin 64 located near the left end of portion 62. Pin 64 cooperates with an escapement mechanism to be described below. Another pin 41*a* (FIG. 6) extends into the bore of the central portion 60 of the hub and rides in spiral groove 48 on the outer periphery of column 40.

An intermediate arm member 65 has an inwardly facing concave surface and a groove 66 to mate with the hub portion 62 and rib 63, and is attached to portion 62 by screws 65*a* or other suitable means. Member 65, in turn, carries an outer arm member 67 which is bolted thereto at 68. Attachment 68 may be adjustable, if desired, to provide for exact initial positioning of member 67. Near the outer end of member 67 is a bore in which is mounted a plastic or other bearing 69 into which extends the upper end of a shaft 70. A magnet 71 is attached to the lower end of shaft 70. The upper portion of shaft 70 extends slideably and rotatably through bearing 69 and is prevented from falling out of the bearing by a retainer 72 attached to the shaft above the upper surface of arm member 67.

A coil spring 73 surrounds the upper end portion of shaft 70. At its lower end the spring abuts against retainer 72, and at its upPer end abuts against a bracket 74 attached to the arm member 67 and spaced above its upper surface. In the position shown in FIG. 4, the upper end of shaft 69 is spaced from bracket 74, permitting shaft 69 to move upwardly a short distance against the bias provided by spring 73. Arm portions 65 and 67 could of course be integral, depending upon manufacturing preferences.

Figure 6:
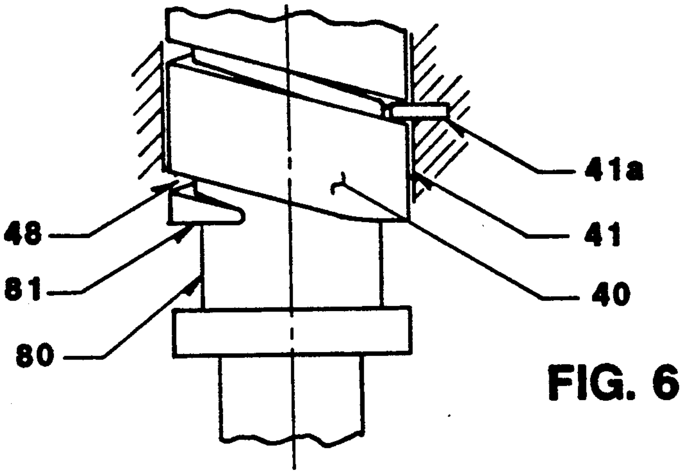
FIG. 6 is a detail elevational view showing the termination of the spiral groove in the column at the lower end of the groove and the hub pin in the groove a short distance above its lower end.

As seen in FIGS. 4 and 6, column 40 has a reduced diameter section 80 near its lower end, forming a shoulder 81 at the upper end of the reduced diameter portion. The lower end of groove 48 opens onto shoulder 81 as shown in FIG. 6 and thus forms a discontinuity in the shoulder.

A coil compression spring 82 is mounted on platform 50 around column 40 so as to be compressed by the bottom surface of hub 60 when the hub reaches its lowermost position. Hub 41 has an inwardly extending pin 41*a* which rides in groove 48. As the column rotates clockwise when viewed from above, the pin rides down the slot, carrying the hub with it, the hub being restrained against rotation by means to be described below. In a preferred mode of operation, when pin 41*a* reaches the lower end of groove 48 and rides onto shoulder 81, motor 45 is operated in each direction for a short distance, causing pin 41*a* to move in the lower end of groove 48. In an alternative mode of operation, the column continues rotating after the pin leaves the lower end of the groove. In both modes of operation, each time pin 41*a* enters the lower end of the slot, spring 82 pushes hub 41 upwardly a short distance. When pin 41*a* again rides on shoulder 81, the hub is pushed downwardly by the camming action of the shoulder on pin 41*a*. These modes of operation of column 40 thus cause a limited vertical reciprocation of the hub and film holders carried by it to agitate film when in a liquid treatment station.

Figure 3:
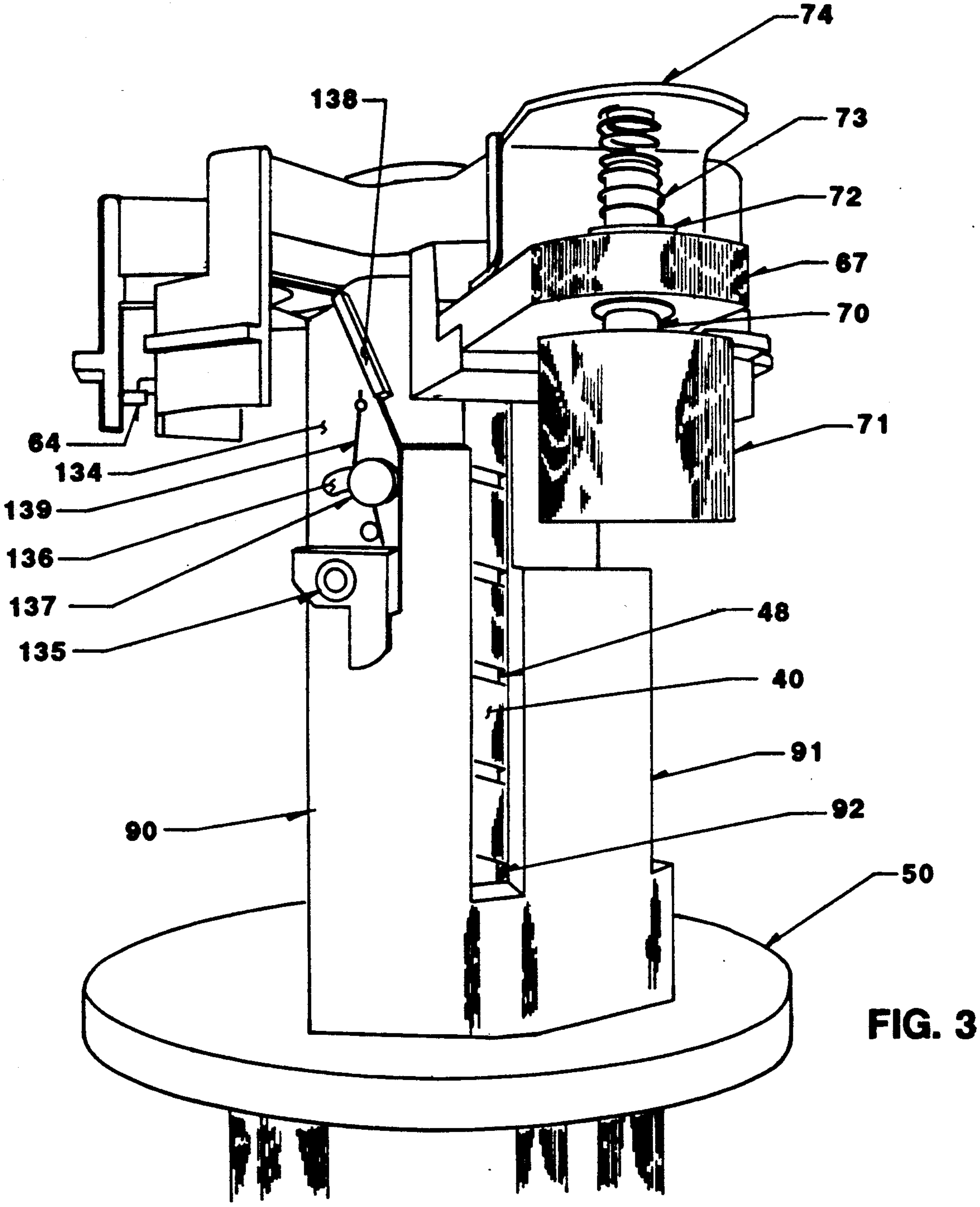
FIG. 3 is a closer view, similar to FIG. 2, but taken from a different angle, and without a film holder attached to the arm (which points toward the viewer), the hub being near but not quite at the upper limit of its vertical movement.

The construction by which hub 41 is normally restrained against rotation with column 40 is as follows. As best seen in FIGS. 3 and 5, base 50 supports two vertically extending guide members 90 and 91 which are spaced a short distance apart to provide a guideway 92. The relatively narrow arms 61 have a width which is slightly less than the width of guideway 92.

Clockwise rotation of column 40 takes place only when one of these webs 61 is aligned with the guideway and can move downwardly in the guideway as such rotation moves pin 41*a* downwardly in groove 48 and thereby moves hub 41 downwardly until the pin escapes from the lower end of the groove, as discussed above. Upward movement of hub 41 is achieved by reversing the rotation of the column to counterclockwise. This causes pin 41*a* to reenter groove 48 and move upward in the groove, carrying the hub and arms 42 with it.

THE FILM HOLDER

FIGS. 7 and 8 show one embodiment of the film holder, a preferred embodiment being shown in similar. Referring first to FIG. 7, the holder comprises a cylinder 90 which is open at the bottom and has a series of spaced slots 902 extending from its upper edge part way down the height of the cylinder. A circular plate 946 of greater diameter the cylinder and is concentric therewith. Plate 946 has a series of slots 93, each of which communicates with one of the slots 902. Other portions of plate 946 may be removed to facilitate movement of liquids and air though the holder. Extending axially through and attached to plate 946 is shaft 54 which terminates at its lower end in a pointed or frustoconical portion 53 as referred to above. The lower end of the shaft is level with or slightly above the plane of the lower end of cylinder 90. Slots 93 are of a length slightly greater than the film to be received in the slot, and these slots are canted from radii of shaft 54. Magnetic material, such as a magnet 71*a*, is attached to the upper end of shaft 54.

A second or upper circular plate 94 generally similar to plate 946, is moveably but snugly mounted on shaft 54. Plate 94 has a series of slots 95 corresponding in number, size, shape and orientation, to slots 93. As shown at 95*a* in FIG. 12, the edges of slots 95 are preferably sloping to facilitate loading film into these slots. Plate 94 has a notch 94*a* communicating with its central opening through which the shaft extends (FIG. 7). In one embodiment, this notch cooperates with a key 96 fixed to shaft 54, the key having an enlarged lower portion 96*a* which defines the limit of downward movement of plate 94. The cooperation of key 96 and notch 94*a* limits rotational movement of upper plate 94 relative to shaft 54 and lower plate 946, and in one embodiment defines the processing position of the upper plate, in which position its slots 94 are offset from slots 93 in the lower plate.

In a preferred embodiment, the key and notch 94*a* define the loading position of the upper plate, with the slots of the two plates aligned. As this embodiment is shown in FIG. 12, the magnetic part 71*a* is of greater diameter than shaft 54 and an "O" ring 94*b* of a high friction material, such as rubber, is fitted tightly around the shaft and snugly against the lower surface of magnetic part 71*a*. After loading film into the holder, upper plate 94 is disengaged from the key 96, is rotated enough to move its slots out of alignment with slots 93 in the lower disc, and is pressed firmly against "O" ring 94*b*, its frictional engagement with which, combined with its snug fit on shaft 54, holds the upper plate in this upper position during processing.

To load film into the holder, in both embodiments, upper plate 94 is moved to a position with its slots aligned with the slots in the lower plate. It is then moved to a processing position. In the preferred embodiment, utilizing the "O" ring, upper plate 94 is positioned above the level of liquid in the processing tanks when the holder is lowered into and reciprocated in the tanks. This reduces the amount of liquid carry over from one station to the next. In this elevated position on shaft 54, upper plate 94 is still close enough to the upper edges of film in the holder to prevent film from escaping the holder during processing.

In the construction shown in FIG. 7, a second key, not shown, may be used if desired to define the loading position. After film is loaded through the slots in the upper plate, the plate is rotated to engage key 96 with the notch, and plate 94 is slid downwardly until stopped by enlarged portion 96a of key 96. In this processing position, the bottom surface of plate 94 is spaced slightly above the upper edges of film that has been loaded through slots 95 into slots 93 and 902. For unloading, the loading procedure is reversed.

THE LOADING STATION

The enclosure for the various stations is light tight so that the processor can operate without the entire room being dark, room darkness being required only during loading of the device. Depending upon the sensitivity of the film, an appropriate safelight may of course be used, rather than total darkness. The device is constructed with a light tight closure at the loading station, so that once the loading into the processor is accomplished and the loading opening closed, room lights may be on.

Figure 9:
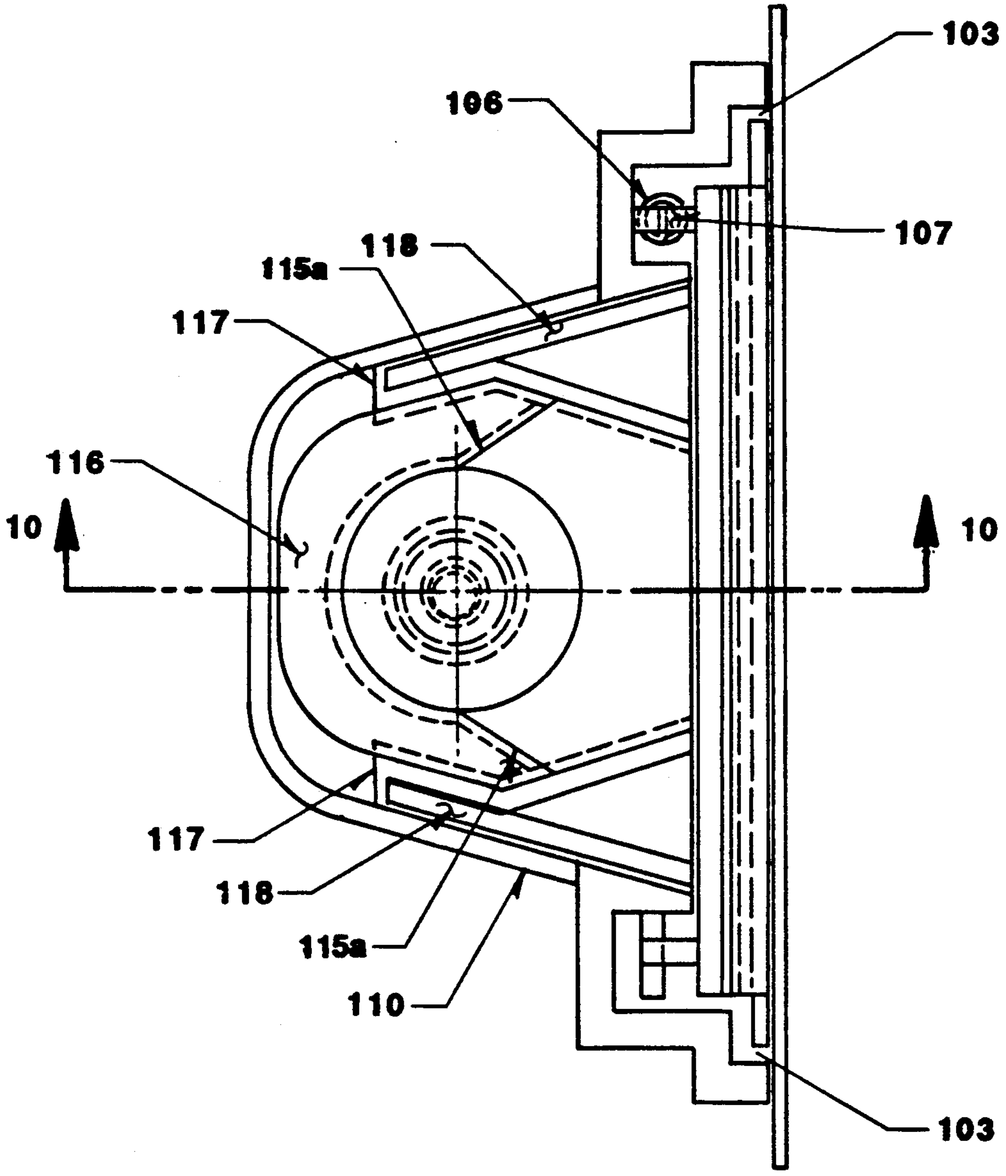
FIG. 9 is a top plan view of the loading station.
Figure 10:
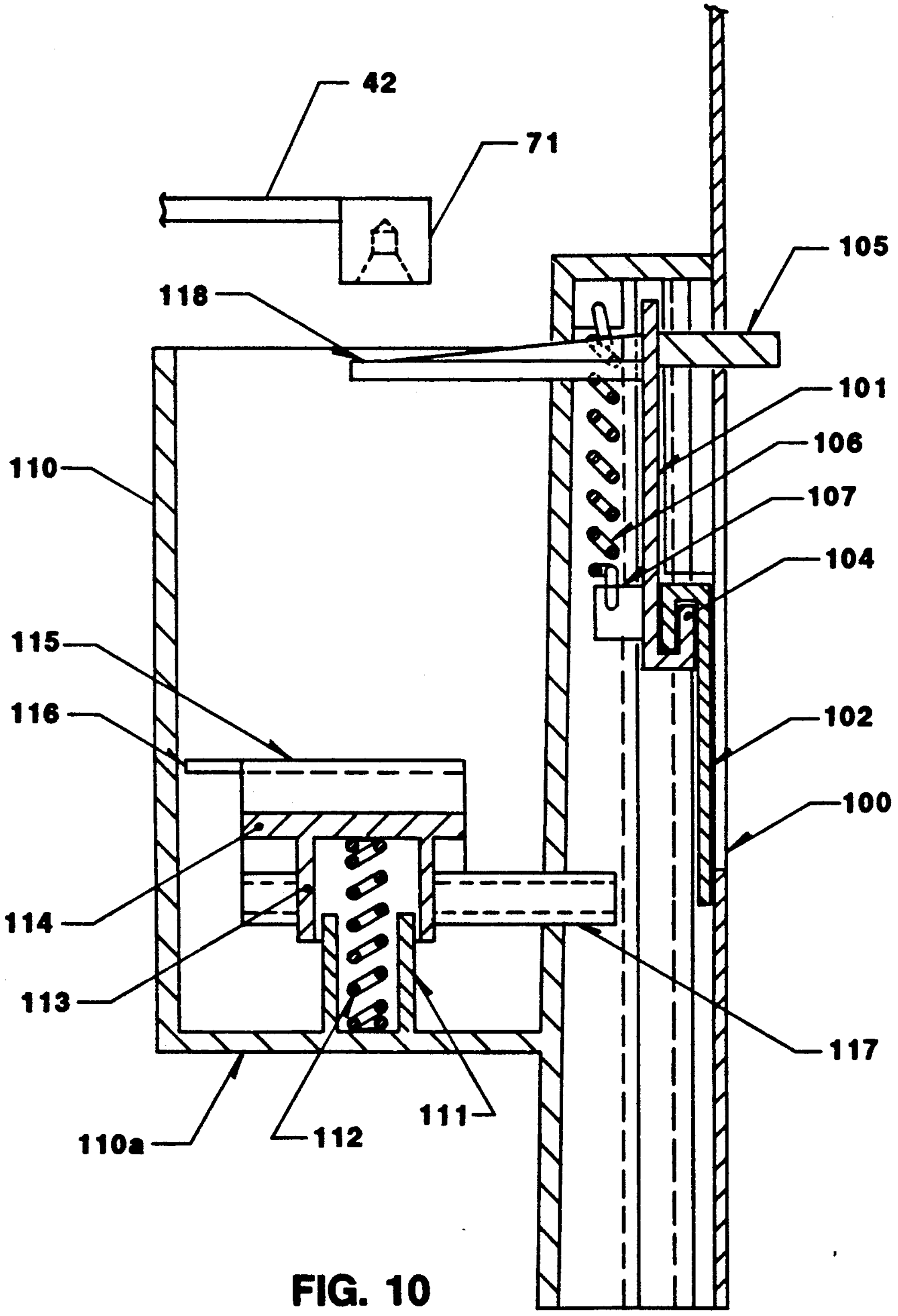
FIG. 10 is cross sectional view taken on line 10—10 of FIG. 9.
Figure 11:
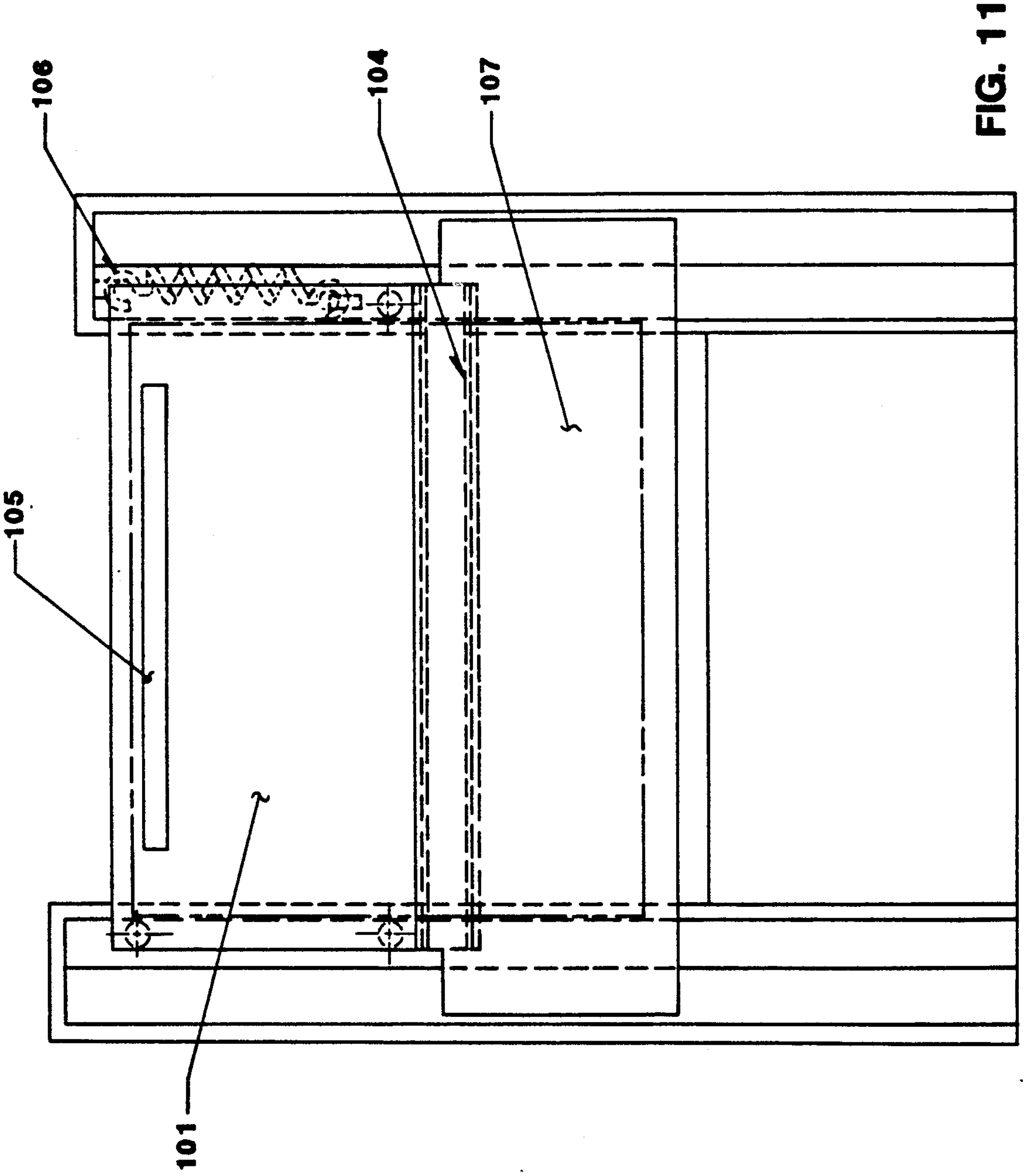
FIG. 11 is a front elevational view of the loading station door construction.

As shown in FIGS. 9, 10 and 11, a loading opening 100 is provided in housing 20 at the loading station 22. This opening is closed by an upper door 101 and a lower door 102, both of which slide up and down in guideways 103 located on each lateral side of the loading opening. The lower edge of upper door 101 and the upper edge of lower door 102 have an interlocking, light tight cooperation as shown in cross section at 104 in FIG. 10. The upper door has an operating handle 105 extending toward the operator. When this handle is pushed downwardly by the operator, its bottom surface contacts the upper end of lower door 102 during the final portion of the downward movement of the handle, and pushes the lower door down to open position. This movement is resisted by a coil spring 106 anchored to the housing at the upper end of the spring, and fastened to a projection 107 on the back side of the upper door. When downward pressure on handle 105 is released after loading, spring 106 pulls the upper door to its closed position and interlock 104 pulls lower door 102 up with the upper door to the closed position shown in FIG. 10.

Inside the loading station, a housing 110 segregates the station at the sides and bottom from the rest of the stations. Bottom wall 110a of this housing supports an upwardly extending cylindrical guide 111 which contains a coil spring 112. Fitting about guide 111 and telescoping with it is a larger cylinder 113 attached to the underside of a flat loading platform 114 of circular configuration which is biased upwardly by the pressure of spring 112 against the bottom surface of loading platform 114.

Loading platform 114 has a vertical wall 115 around its rear portion to define a horizontal surface configuration matching the horizontal cross section of cylinder 90 of the film holder. One of the arms 42 is indicated in a non-detailed manner with its magnet 71 aligned with the center of the film holder position on platform 114. Wall 115 flares at the front as shown at 115a to facilitate sliding a film holder onto loading platform 114. Wall 115 has along its upper edge an outwardly extending flange 116 and has lateral extensions 117 on each side. These extensions are positioned for engagement by two rearwardly projecting arms 118 located on the rear side of upper door 101, when the door is depressed. These arms are near the upper edge of door 101. When the door is fully open, these arms depress the loading platform 114 against the bias of spring 112. Upward movement of the door toward its closed position then permits spring 112 to restore the platform to its normal elevated position. This movement carries the newly loaded film holder upwardly sufficiently for the magnetic material 71a on the upper end of shaft 54 to engage magnet 71 carried by arm 67 so that when the arm is lifted, the holder is lifted with it.

THE UNLOADING STATION

The unloading station 30 is not shown in detail in the drawings. It consists merely of a pair of springs or other deflectors positioned to engage the upper surface of film holder plate 94 on opposite sides of shaft 54 when arm 67 carrying the holder loaded with processed film is rotated to a position over unloading station 30. These springs are positioned at an angle to the path of travel of the film holder and are sufficiently stiff to loosen and detach the film holder magnetic part 71a from arm magnet 71. The film holder then drops into a chute which conveys it to the operator for unloading of film and reuse of the film holder.

THE ESCAPEMENT MECHANISM

One form of escapement mechanism, best seen in FIG. 3–5, comprises two devices mounted near the upper ends of the two uprights 90 and 91 to define the stop position of hub 41, arms 42 and film holders 43. As previously described, upright guide members 90 and 91 are spaced apart a distance slightly greater than the width of the narrow arm portions 61 so as to provide a guideway 92 for those arm Portions. These uprights are spaced a short distance from column 40 to provide room for the central portion of hub 41 and coil spring 82 which encircles the lower end of the column and which, as explained above, bears against base 50 and the bottom surface of hub 41 when the latter is at its lowermost position.

Upright guide member 90 carries on its outside surface, blocking detent means comprising an arm 134 which pivots about hinge pin 135 mounted on that upright. The pin extends radially of the column. Arm 134 has an arcuate slot 136 into which extends a movement limiting pin 137 fixed to upright 90. At its upper end arm 134 has an integral flange 138 extending away from column 40. Flange 138 is slanted with respect to the axis of column 41 in the normal or rest position of arm 134. A spring 139 biases arm 134 to this normal position. Flange 138 extends a sufficient distance from the axis of column 40 to position its rear surface in the path of movement of engaging means in the form of pins 64 when hub 41, at the limit of its upward movement, rotates counterclockwise. In the normal position of arm 134, flange 138 does not interfere with the pin 64 on a radial arm 64 moving upwardly with the hub along the column. It should be pointed out that in FIG. 3, hub 41 is not quite at the limit of its upward movement. When it reaches that limit, the lower edges of arm portions 61 are higher than the upper ends of uprights 90 and 91.

Referring now to FIG. 5, the upper end of upright 902 carries a bracket with two spaced arms 140 which slideably guide an elongated post 141 which is vertically moveable relative to the bracket. The upper end of the post carries an elongated blocking member 142 which has a vertical surface 143 at its counterclockwise end, while its upper surface 144 slopes upwardly to the upper end of surface 143. A coil spring 145 surrounds post 141 and urges it upwardly, this movement being limited by a pin 146 carried by the post and engaging one of the arms 140. Surface 144 is normally at an elevation such that when an arm 61 moves up and out of guideway 92 and then moves counterclockwise to the next station, the pin 64 on that arm slides along surface 144 and forces post 140 downwardly against the spring bias until the pin clears surface 144. At that point spring 145 restores post 140 to its uppermost, normal position and pin 64 is in contact with vertical surface 143 so that surface 143 blocks return clockwise movement of the arm 61 by blocking such movement of the pin 64 carried by the arm. Thus, when the column rotation is changed from counterclockwise to clockwise in order to lower the hub and attached arms, the arms still being above the upper end of guideway 92, the arms cannot move in a clockwise direction with the column because such movement is blocked by member 142.

Figure 13:
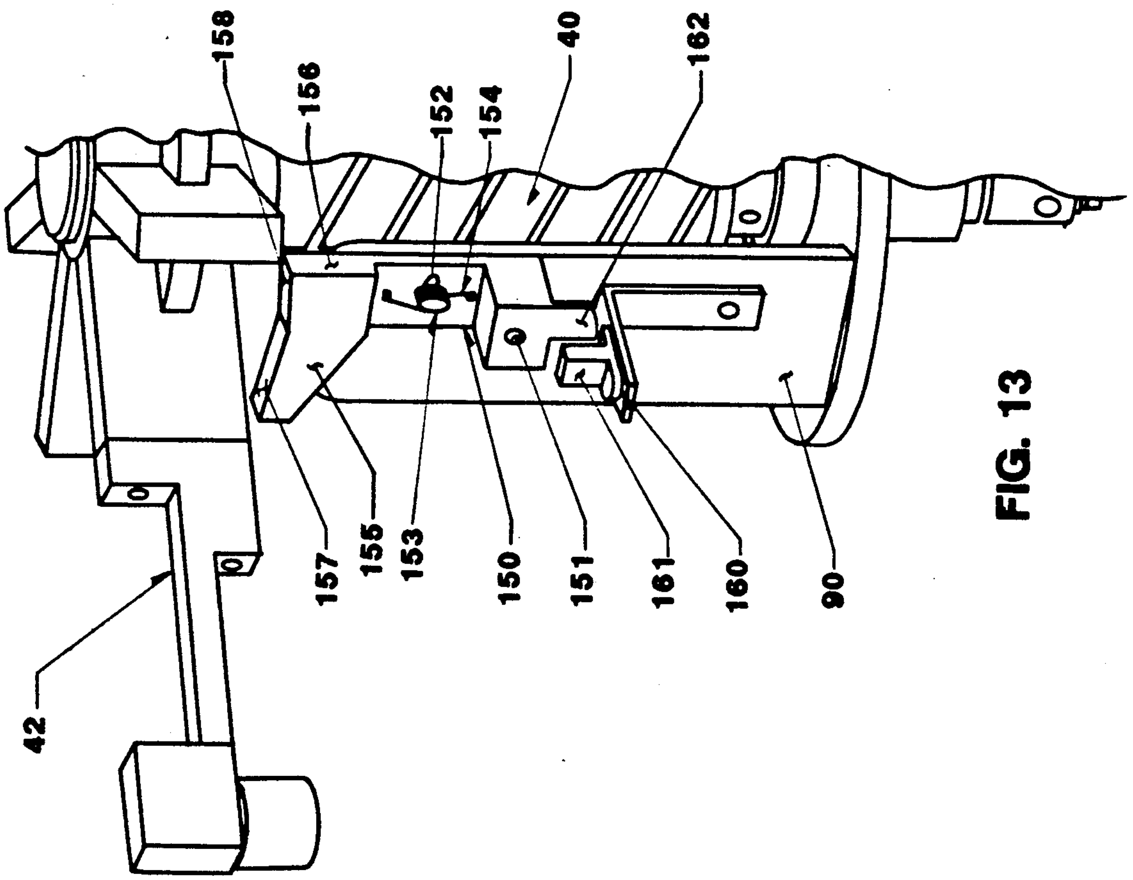
FIG. 13 is a perspective view from an angle similar to FIG. 3, omitting substantial detail, but showing a preferred form of escapement mechanism.

FIG. 13 shows a preferred form of escapement mechanism. The mechanism just described is intended for operation with a DC motor which can drive column 40 both clockwise and counterclockwise. If such motor is not a stepper motor, the mechanism just described is appropriate. When using a stepper motor at 45, column 40 can be rotated in both directions but with highly accurate control of the rotational position of the column. The stepping is set to rotate the column counterclockwise by the exact number of steps to move one arm 42 from a position over guideway 92 to the next station and bring the succeeding arm into alignment with the guideway. With the stepping motor, both mechanisms 135–139 and 140–146 shown in FIG. 5 are eliminated and a single escapement mechanism (shown in FIG. 13) is used to prevent reverse (clockwise) movement of the hub once an arm is moved into alignment with the guideway, but while it is still above the upper end of the guideway.

The device of FIG. 13 comprises a pivoted member 150, similar to member 134 of FIG. 5, with a pivotal mounting 151 on guide 90. Guide 91 is not shown in this FIG. but is of course needed to provide the guideway 92 in cooperation with guide 90. Member 150 has an arcuate slot 152 through which extends a post 153 attached to guide 90. A spring 154 is mounted about post 153 and operates, as did the spring 139 in FIG. 5, to rotate member 150 to the limit of its counterclockwise movement as Permitted by slot 152 and pin 153.

On the upper end of member 150 is a blocking element 155 similar in function to member 142 in FIG. 5, but of different configuration. The right hand surface 156 of member 155 is normally vertically disposed and in line with the right hand edge of guide 90. In that position, the upper end of that surface blocks clockwise movement of an arm 42 aligned with guideway 92.

The upper surface of member 155 has two portions. The clockwise portion 157 is normally horizontal and below the level of the bottom surfaces of arms 42 when they are in their uppermost position. Thus the arms can move freely over that portion of member 155 when in that elevated position. Surface portion 157 merges in a counterclockwise direction into an upwardly sloping surface portion 158. The slope of portion 158 is such that its end at the upper end of surface 156 lies above the path of travel of the lower surface of arms 42. As a result, when an arm 42 rotates counterclockwise to member 155, it moves over the surface portion 157 and then encounters sloping portion 158, causing member 155 to pivot in a clockwise direction until arm 42 is clear of member 155. The member is then moved by spring 154 back to its original position and surface 156 blocks return movement of the arm 42 which has just moved over member 155.

An optical switch 160 tells the control apparatus that the above described operation has been completed so that the motor can reverse the rotation of column 40 to lower the hub and arms for the next processing operation. The optical switch comprises a sender and receiver located in spaced relation on guide 90 just below pivot 151. One of these switch parts is shown at 161; the other is closer to guide 90. The light beam across the gap between the two switch parts is interrupted by a downwardly extending tab 162 on member 150 below pivot 151. FIG. 13 shows this tab in its normal position clear of the gap between the switch parts, but the system can be set up to make the beam interrupting position the normal position of the tab.

SUMMARY OF OPERATION

To start, the operator, working in the dark or with a safelight, strips the covering from the exposed intraoral xray films and loads the film into a carrier. The plates of the carrier are shown in FIG. 7 in loading position with their slots 93 and 95 aligned. After loading the film through slots 95 into the slots in lower plate 946 and cylinder 90, upper plate 94 is rotated 20 degrees about shaft 54 and moved to the processing position as explained above, with the slots 95 in the upper plate out of alignment with the slots 93 in the lower plate so that the films cannot move upwardly out of slots 93 until the upper plate is restored to its loading position.

The operator then places the film holder in the processing apparatus through the loading doors shown in FIGS. 9, 10 and 11. Pressing down on door operating handle 105 opens both doors. At the lower limit of movement of the upper door 101, its inwardly extending arms 118 engage surface 117 attached to loading platform 114 and push the loading platform downwardly against the bias of spring 112. The film holder is then introduced into the loading station by placing cylinder 90 on the seating provided by wall 115 on loading platform 114. When this has been done, the operator permits spring 106 to close the doors. With the release of downward pressure by arms 118 on surfaces 117, spring 112 moves the loading platform and film holder upwardly to its normal, elevated position to engage the magnetic material **71*a* on the upper end of film holder shaft 54 with magnet 71 carried by the arm 61, 65, 67** positioned above the loading station. The operator will of course have a number of film holders, and as one is loaded and the processing of its film begun, another can be loaded and placed in the apparatus for movement up to the next (clockwise) radial arm following the one just started through the processing sequence.

The apparatus is operated by a microprocessor (mP), not shown, which receives a signal sent by closing of the loading doors, whereupon the mP starts the process by taking the processor out of standby. The mP starts a stepping motor 45 of FIG. 2, which rotates column 40, initially rotating the column counterclockwise to raise hub 41 and the seven arms which extend radially from the hub at angular positions spaced by 51.43 degrees. This rotation continues for 3.125 turns of column 40, which moves hub 41 to its uppermost position. The motor then rotates the column counterclockwise an additional 51.43 degrees, hub 41 moving with it due to the engagement of pin 41*a* with the upper end of groove 48 in the column. This moves the arm carrying the loaded film holder to a position above the open receptacle containing the developing solution. The escapement mechanism described above assures stopping of hub rotation with the clockwise next arm in alignment with guideway 92, and also assures that the hub and arms cannot move clockwise when the column is rotated clockwise.

The mP then rotates column 40 clockwise (viewed from above) to move pin 41*a* downwardly in groove 48, carrying with it hub 41 and the seven arms carried by the hub. The film holder just loaded enters the developing solution and is agitated by the limited vertical reciprocation of hub 41 and its arms caused by pin 41*a* alternately entering and leaving the lower end of groove 48 and the upward bias of spring 82 against the bottom surface of hub 41. Each arm moves downwardly with hub 41, the arm located above the guideway moving downwardly into the guideway to the loading station.

When the mP has timed out this step, it again directs the motor to rotate the column counterclockwise to raise the hub and arms, and then to effect the 51.43 degrees counterclockwise rotation of the hub and arms. Optical switch 160 insures that the stepping motor does not start the next clockwise rotation of the column until an arm has moved past the escapement mechanism shown in FIG. 13. Clockwise rotation of the column lowers the hub and arms again for the next step in the processing. All of the cycles have the same duration. This permits all seven arms to carry film holders, if desired, or random arms to carry film holders.

As explained above, the film being processed is moved from the developing station to a fixing station, then to a wash bath. It is then moved to a spin station where it is spun rapidly, for example at 2000 rpm, to remove excess moisture and thereby reduce drying time. The mP operates the appropriate spin motor only when it knows a film holder is at a spin station. In the drying station which follows the spin station, hot air is blown on the film while the film holder is rotated at about 200 rpm. Again, the mP knows when a loaded film holder is in the drying station and turns on and off the spin motor, air heater and blower as appropriate.

As explained, the agitation reciprocation of the hub and arms continues at all stations. The construction shown in FIG. 4 at the ends of arms 67 permits this to take place at the spinning stations without interfering with engagement of the lower end of film holder shaft 54 with the rotating cup-like member 52 which imparts rotation to the film holder. The spring mounting of the upper end of shaft 70 which carries magnet 71 absorbs the up and down movement of arm 67 at the spinning stations without this movement causing disengagement of the spin driving connection at the lower end of the film holder. When a film holder is in a liquid, there is little resistance to the reciprocation of the holder so the spring mounting is adequate to transmit the agitation motion to shaft 54.

After the drying cycle the carrier is moved to the unloading station where the magnetic connection is broken, permitting the film holder with the completely processed film to fall into a chute and out to the operator. If there is no other film loaded holder in the apparatus, the mP switches the machine to standby, otherwise it will continue cycling until all film in the apparatus has been processed and delivered to the unloading station.

The developer and fixer solutions and the wash water are in tanks open at their upper ends and fed by containers as indicated at 25*a*, 26*a*, and 27*a* in FIG. 1. The containers are connected to feed the tanks by a "chicken feeder" arrangement which automatically maintains the liquids in the tanks at a proper level. If desired, the wash water may be provided by a connection to an external water supply, with a solenoid valves operated by the mP, controlling feed to the wash water tank and drain. This option would require an external drain for the used wash water.

Auto-replenishment of the liquids is controlled by the mP, which keeps track of the number of film holders run through the apparatus and operates drain valves for the respective tanks when appropriate. The "chicken feeder" arrangement then tops off the tanks. Also, every time the processor is powered up, a small amount of developer and fixer will be automatically drained off and replaced by fresh solution. Automatic drain off and replenishment may also be achieved by providing in each liquid tank a valve which is contacted by a portion of the film holder when it enters the tank to release a small amount of liquid from the tank.

Expended solution is collected in a waste tank inside the processor or external to it. The mP can also determine when the waste tank needs to be emptied. Electrical probes contacted by the solutions' reaching a predetermined level can signal the mP or light a lamp to alert the operator to dump solution from the waste tank, and the apparatus can be automatically disabled until this has been done. Alternating current is used with the probes to reduce plating and erosion.

The developing and fixing solutions are such that the film is treated for the same period in each solution, and is, of course, washed, spun and dried for the same period. The developer and fixer tanks sit on an electric heater such as a silicone pad heater and the temperature of the solutions is sensed by a thermistor located near the pad. The thermistor signal is compared to a desired temperature signal by a comparator. The comparator drives an optocoupler which turns on and off a triac which controls the pads and thus the temperature of the solutions.

The materials used in the apparatus have not been described, as those skilled in the photographic arts will select synthetic plastic, stainless steel or other materials suitable for use under the conditions prevailing in apparatus for developing film.

The invention has been described with reference to a preferred embodiment, but it will be understood that various modifications may be effected within the skill of the art without departing from the scope of the invention.

We claim:

1. Mechanism for effecting movement of film holder means in processing apparatus for photographic film said apparatus being of the type in which said film holder means is sequentially lowered into and raised out of a plurality of circularly arranged processing stations, comprising:

a rotatable upright column having a spiral groove and located centrally of said stations;

annular hub means slideably mounted on said column and having radially extending means for carrying said film holder means;

said hub means having pin means engaging said spiral groove to cause upward movement of said hub means along said column upon rotation of said column in a first direction and downward movement upon rotation of said column in a second direction; and means securing said hub means against rotation with said column except when said hub means is at an upper portion of said column.

2. Mechanism according to claim 1, further comprising magnetic means releasably attaching said film holder means to said radially extending means:

3. Mechanism according to claim 1, further comprising blocking means engageable by said radially extending means to limit rotational movement of said hub means when said hub means is at said upper end portion of said column.

4. Mechanism according to claim 3, said blocking means leaving said radially extending means free for downward movement.

5. Mechanism according to claim 3, said blocking means being pivotable, and biasing means urging said blocking means to a position of noninterference with upwardly moving radially extending means.

6. Mechanism according to claim 3, said blocking means having a normally vertical detent surface facing in said first direction and an upper surface sloping downwardly in said second direction from the upper end of said detent surface, said upper surface and detent surface being positioned for engagement by said radially extending means; and biasing means urging said blocking means to a blocking position, said blocking means being normally so located that said radially extending means engage and move along said upper surface upon rotation of said hubin said first direction, causing said blocking means to move against said bias until said radially extending means moves beyond said vertical surface, whereupon said biasing means restores said blocking means to said said normal position with said vertical surface in contact with said radially extending means, in which position movement of said radially extending means and hub means in said second direction is blocked.

7. Mechanism according to claim 6, said securing means of claim 1 comprising spaced means forming a guideway in which said radially extending means extend during their upward and downward movement, said vertical detent surface being aligned with said guideway.

8. Mechanism according to claim 1 in apparatus in which some of said processing stations contain liquids, further comprising:

said column having a lower end portion of reduced diameter forming a shoulder at which the lower end of said groove terminates, such that when said hub means is substantially at the limit of its downward movement, said pin means rides on said shoulder;

biasing means moving said hub means upwardly when further rotation of said column moves said groove termination to said pin means; and whereby rotational movement of said column to cause said pin to enter and leave said groove termination causes a limited degree of reciprocating movement of said hub means and radially extending agitation during liquid processing of film in film holder means carried by said radially extending means.

9. Mechanism according to claim 8 wherein said biasing means comprises a coil spring surrounding the lower end of said column.

10. Mechanism according to claim 8, wherein said groove termination is so located that upon rotation of said column in said first direction to terminate said agitation, said pin reenters said groove and causes said hub means to move upwardly with continued rotation of said column in said first direction.

11. Mechanism according to claim 8, said apparatus further comprising a liquid removal station at which the lowered film holder means is spun; and resilient means on said radially extending means for absorbing said reciprocating movement of said radially extending means during said spinning.

12. Mechanism according to claim 1, said securing means comprising said radially extending means and spaced guide means extending along said column to form a guideway which said radially extending means slideably engage, said guide means terminating short of the upper end of said column whereby said radially extending means is clear of said guideway when said hub means reaches said upper end portion of said column.

13. Mechanism as set forth in claim 1, wherein said film holder means comprises:

an open bottomed cylinder having film receiving slot means extending downwardly from its upper edge, a first disc of greater diameter than said cylinder attached to the upper edge of said cylinder, said disc having slot means aligned with and communicating with said cylinder slot means, said disc slot means being canted from radii of said disc, a shaft extending axially of said cylinder and disc and attached to said disc, said shaft being vertically disposed during processing, a second disc having slot means corresponding substantially in number, size and position relative to radii of the disc, to said slot means in said first disc, said second disc being mounted on said shaft above said first disc and movable rotatably and longitudinally of said shaft between (a) a film loading position in which said slot means of both discs are aligned with each other for loading film through said second disc slot means into said slot means of said cylinder and first disc, and (b) a processing position in which said slot means in said second disc are offset from said slot means in said first disc, means for retaining said second disc in said processing position with the bottom surface of said second disc spaced above the upper edges of film in said slot means of said cylinder and first disc, and means at the upper end of said shaft for attaching said film holder means to said radially extending means;

said mechanism having a loading station through which said film holders are loaded into the mechanism, said loading station comprising:

a loading platform having means for accurately positioning a film holder thereon below said radially extending means, biasing means normally urging said platform to an elevated positioning which the upper end of the shaft of a film holder engages and attaches to one of said radially extending means, door means moveable between a closed position blocking access to said platform, and an open position providing access or loading a film holder onto said platform, and means carried by said door means for depressing said platform when said door is in an open position and releasing said platform for movement to said elevated position when said door is moved to said closed position.

14. Film holder means for use in processing apparatus of the type in which said film holder means is suspended from means for transporting it from one processing station to another, comprising:

an open bottomed cylinder having film receiving slot means extending downwardly from its upper edge;

a first disc of greater diameter than said cylinder attached to the upper edge of said cylinder, said disc having slot means aligned with and communicating with said cylinder slot means, said disc slot means being canted from radii of said disc;

a shaft extending axially of said cylinder and disc and attached to said disc, said shaft being vertically disposed during processing;

a second disc having slot means corresponding substantially in number, size and position relative to radii of the disc, to said slot means in said first disc, said second disc being mounted on said shaft above said first disc and moveable rotatably and longitudinally of said shaft between (a) a film loading position in which said slot means of both discs are aligned with each other for loading film through said second disc slot means into said slot means of said cylinder and first disc, and (b) a processing position in which said slot means in said second disc are offset from said slot means in said first disc;

means for retaining said second disc in said processing position with the bottom surface of said second disc spaced above the upper edges of film in said slot means of said cylinder and first disc; and means at the upper end of said shaft for attaching said film holder means to said means for moving said film holder means.

15. Film holder means according to claim 14, said retaining means comprising an "O" ring of high friction material on said shaft engaging said second disc when the latter is in said processing position.

16. Film holder means according to claim 14, said retaining means comprising cooperating and notch means on said shaft and second disc.

17. A loading station for film processing apparatus of the type in which a film holder is suspended from means for transporting the film holder from one processing station to another, comprising:

a loading platform having means for accurately positioning a film holder thereon below said transporting means;

biasing means normally urging said platform to an elevated position in which a film holder thereon engages said moving means;

door means moveable between a closed position blocking access to said platform, and an open position providing access for loading a film holder onto said platform; and means carried by said door means for depressing said platform when said door means is in open position and releasing said platform for movement to said elevated position when said door is moved to said closed position.

* * * * *